United States Patent [19]

Muranaka et al.

[11] Patent Number: 4,873,953

[45] Date of Patent: Oct. 17, 1989

[54] INDUCTION PORT ARRANGEMENT FOR INTERNAL COMBUSTION ENGINE HAVING MULTIPLE INLET VALVES PER COMBUSTION CHAMBER

[75] Inventors: Shigeo Muranaka, Yokosuka; Kouzaburou Ohkawa, Yokohama; Junichi Yokoyama, Zushi; Yutaka Matayoshi, Yokosuka; Shigeru Kamegaya, Tokyo, all of Japan

[73] Assignee: Nissan Motor Co., Ltd., Yokohama, Japan

[21] Appl. No.: 258,048

[22] Filed: Oct. 17, 1988

Related U.S. Application Data

[63] Continuation of Ser. No. 788,134, Oct. 16, 1985, abandoned.

[30] Foreign Application Priority Data

Oct. 17, 1984 [JP] Japan ................... 59-217548
Jan. 24, 1985 [JP] Japan ..................... 60-9851

[51] Int. Cl.$^4$ ............................. F02M 35/10
[52] U.S. Cl. ................... 123/308; 123/188 M
[58] Field of Search ............... 123/432, 308, 188 M, 123/306

[56] References Cited

U.S. PATENT DOCUMENTS

| 4,133,331 | 1/1979 | Otsubo ................ 123/638 |
| 4,354,463 | 10/1982 | Ohtani ................ 123/308 |

FOREIGN PATENT DOCUMENTS

| 137393 | 4/1985 | European Pat. Off. ....... 123/308 |
| 56-44404 | 4/1981 | Japan ................ 123/308 |
| 58-148229 | 3/1983 | Japan ................ 123/308 |
| 58-150025 | 6/1983 | Japan ................ 123/308 |
| 59-93926 | 5/1984 | Japan ................ 123/308 |
| 59-105925 | 6/1984 | Japan ................ 123/308 |
| 59-105926 | 6/1984 | Japan ................ 123/308 |

OTHER PUBLICATIONS

Patent Abstracts of Japan, vol. 8, No. 203(M–326) (1640) Jap. 59–93926(a), Sep. 18, 1984.

Primary Examiner—Willis R. Wolfe
Attorney, Agent, or Firm—Foley & Lardner, Schwartz, Jeffery, Schwaab, Mack, Blumenthal & Evans

[57] ABSTRACT

In order to prevent the electrodes of the spark plug from becoming wetted with droplets of liquid fuel during low temperature and/or idling operation of the engine in a manner which deteriorates engine stability, the branches of a bifurcate intake passage which cooperates with a dual inlet valve arrangement are arranged to guide the unvaporized liquid fuel into the combustion chamber in a manner which obviates contact with the plug. In some embodiments a passage which is adapted to produce a swirl in the combustion chamber is arranged so that the fuel which passes therethrough (usually in the form of a film on the walls of branches) and which has a relatively large inertia as compared with the gaseous charge, enters the combustion chamber with a velocity which carries it along a flight path non-intersective with the plug electrodes. In another arrangement, the swirl generating passage is arranged to branch off from the side of the other one which is essentially coaxially aligned with the passage of the induction manifold. With this arrangement most of the liquid fuel tends to pass into the essentially coaxially aligned one under the influence of its own inertia and thus reduces the amount of liquid fuel entering the swirl generating one.

13 Claims, 4 Drawing Sheets

FIG.6
FIG.7
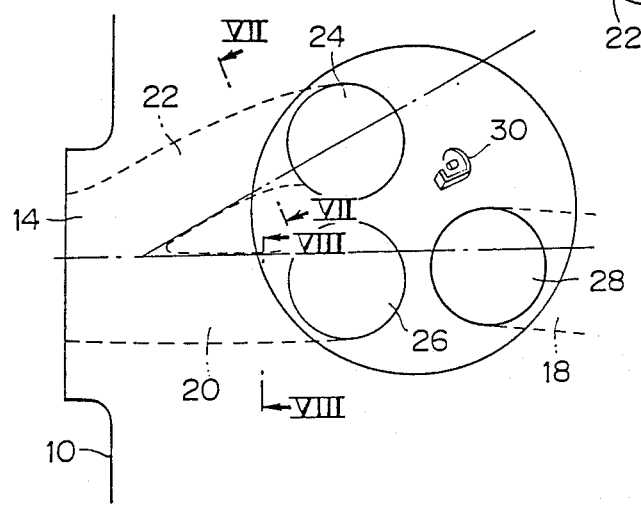
FIG.8
FIG.9
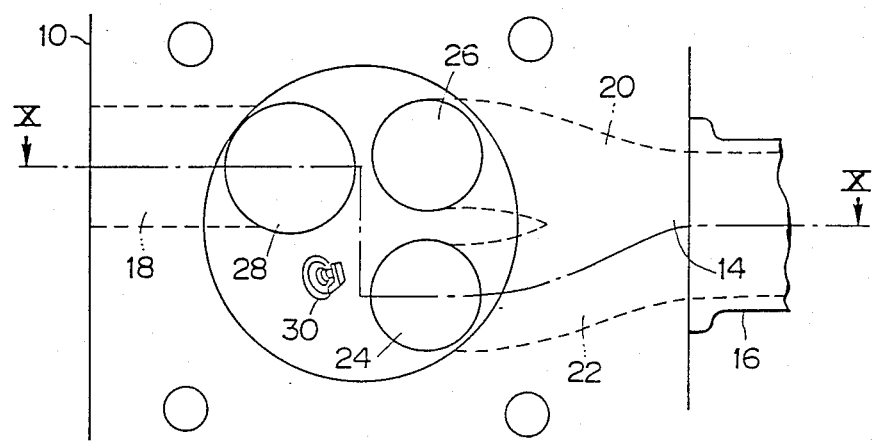

INDUCTION PORT ARRANGEMENT FOR INTERNAL COMBUSTION ENGINE HAVING MULTIPLE INLET VALVES PER COMBUSTION CHAMBER

This application is a continuation of application Ser. No. 788,134, filed Oct. 16, 1985 now abandoned.

BACKGROUND OF THE INVENTION

1. Field of the Invention

The present invention relates to a multi inlet valve internal combustion engine and more specifically to an inlet port arrangement for such an engine which reduces the wetting of the spark plug electrodes during low engine temperature and/or idling operation.

2. Description of the Prior Art

FIG. 1 shows a prior art multi inlet valve type engine of the nature disclosed in Japanese Patent Application First Provisional Publications Sho59-93926, 59-105925 and 59-105926. In these arrangements two inlet valves 1,2 and one exhaust valve 3, are arranged to control the communication between the induction and exhaust systems and each combustion chamber. However, these arrangements encounter the problem that when the engine temperature is low and/or the engine is idling, the fuel passing through the induction system tends to be poorly carburetted and the air-fuel mixture contains a large amount of unvaporized liquid fuel. Accordingly, as the inlet valve 2 is opened before valve 3 (by a suitable valve train) under such conditions and the section 5 of the bifurcate or so called siamesed port 6 which is associated with valve 2 is designed to direct the flow of air fuel mixture into the combustion chamber in a manner to swirl therearound, the liquid fuel contained in the charge tend to carried toward and impinge on the electrodes of the spark plug 6. This of course wets the plug and hampers efficient ignition of the air-fuel mixture, destablizes engine operation and invites notable increases in HC emissions under such conditions.

SUMMARY OF THE INVENTION

It is an object of the present invention to provide a bifurcate induction port arrangement for an internal combustion engine which obivates the wetting of the spark plug by imparting a velocity on the liquid fuel (which tend to have a relatively high inertia) which velocity carries same along a flight path which is non-intersective with the spark plug.

In brief, in some embodiments of the present invention a passage which is adapted to produce a swirl in the combustion chamber is arranged so that the liquid fuel which passes therethrough enters the combustion chamber with a velocity which carries same along a flight path non-intersective with the plug electrodes; while in another arrangement, the swirl generating branch passage is arranged to open into the side of the high speed one. The latter is essentially coaxially aligned with the passage of the induction manifold so that most of the liquid fuel tend to pass thereinto under the influence of its own interia and thus reduces the amount of liquid fuel in the flow which swirls about the combustion chamber.

More specifically, a first aspect of the present invention takes the form of an internal combustion engine which has a combustion chamber, first and second inlet valves, an exhaust valve and a spark plug and which is characterized by a bifurcate intake port having a main section with an entrance adapted to communicate with an induction system and first and second branch passages which lead from the main section to the first and second inlet valves, respectively, the first branch passage being arranged to guide the air-fuel mixture entering the main section in a manner that liquid fuel which has a relatively high inertia as compared with the remaining air-fuel charge is caused to have a velocity which leads it along a flight path which is non-intersective with the spark plug.

A further aspect of the invention comes in a method of operating an internal combustion engine comprising the steps of: forming an air-fuel mixture; directing the air-fuel mixture to a combustion chamber though a bifurcate intake port; configuring the passages of the bifurcate intake port to cause liquid fuel contained in the air-fuel charge to have a velocity which carries it along a flight path which is non-intersective with a spark plug which projects into the combustion chamber.

BRIEF DESCRIPTION OF THE DRAWINGS

The present invention will become more clearly appreciated from the following description taken in conjunction with the accompanying drawings in which:

FIG. 6 shows a second embodiment of the present invention;

FIGS. 7 and 8 are sectional views taken along section lines VII—VII and VIII—VIII of FIG. 6, respectively;

FIGS. 9 and 10 shows in plan and sectional elevation respectively, a third embodiment of the present invention;

DETAILED DESCRIPTION OF THE PREFERRED EMBODIMENTS

Figure 1:
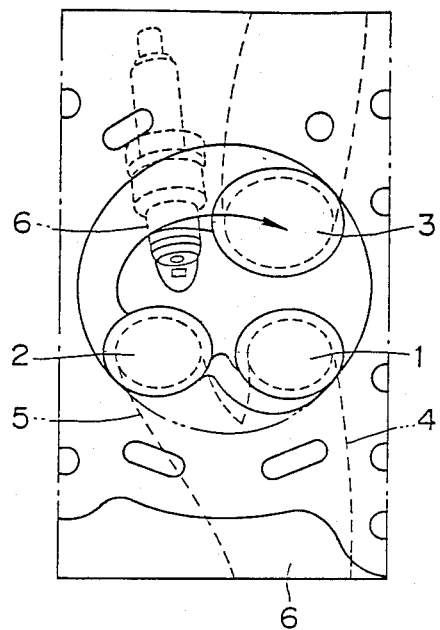
FIG. 1 is a plan view of the lower face of a cylinder head showing the prior art arrangement discussed briefly in the opening paragraphs of the instant disclosure.
Figure 2:
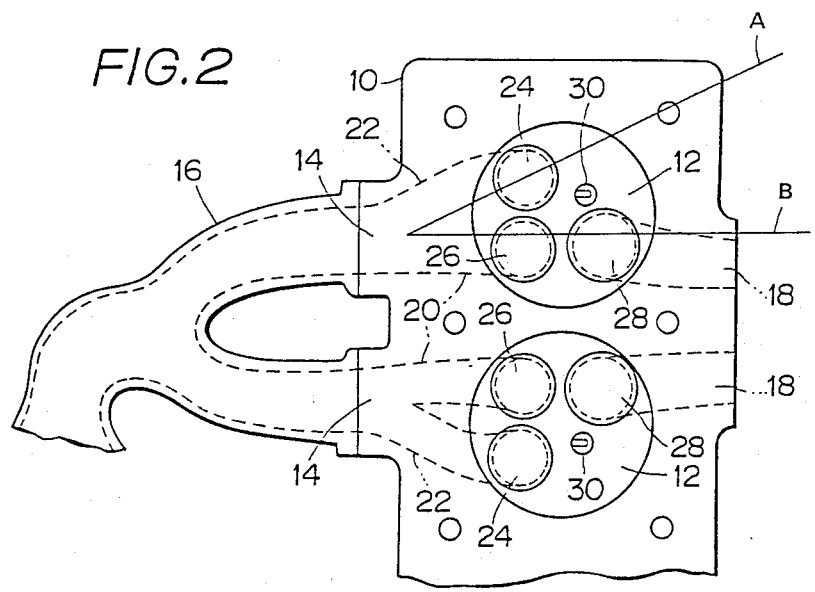
FIG. 2 is a plan view of the lower face of a cylinder head which is equipped with a first embodiment of the present invention.
Figure 3:
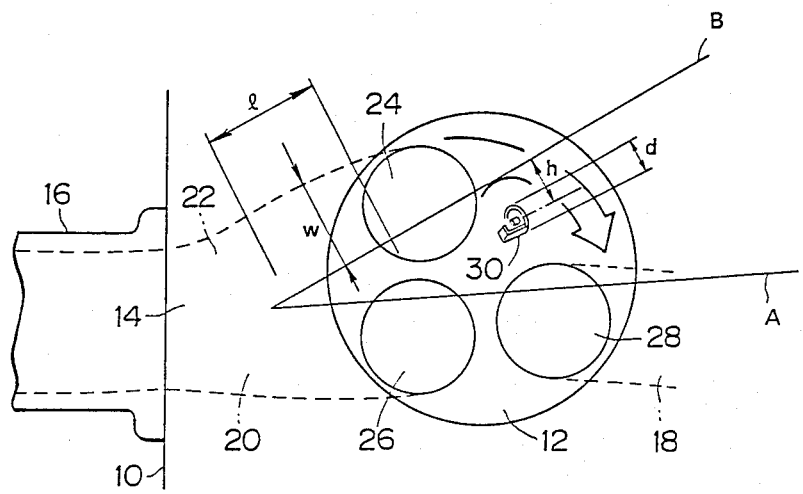
FIG. 3 is a enlarged partial view of the FIG. 2 arrangement showing a single combustion chamber arangement and which depicts the dimensions and orientation which characterize the first embodiment.

FIGS. 2 and 3 show a first embodiment of the present invention. In this arrangement a cylinder head 10 is formed with a plurality of combustion chamber defining recesses 12 and bifurcate or siamesed intake ports 14. As shown in FIG. 2, each of the bifurcate intake ports 14 communicates with an induction manifold 16. The cylinder head 10 is also formed with a plurality of exhaust ports 18 which are adapted to communicate with an exhaust manifold (not shown). As best seen in FIG. 3 each of the bifurcate intake ports 14 includes first and second branch passages 20, 22.

Communication between the branches 20, 22 and the combustion chamber is controlled by first and second valves 24, 26 respectively. Communication between each of the exhaust ports 18 and the combustion chamber is controlled by an exhaust valve 28. A spark plug 30 is arranged to be threadedly received in a bore formed in the cylinder head in a manner to project into the combustion chamber.

The first embodiment of the present invention overcomes the wetting problem encountered with the prior art by configuring the bifurcate intake port 14 so that branch 20 is essentially alinged with the branch runner of the induction or intake manifold 16 and the exhaust port 18 (as seen in plan) and so that other branch 22 deviates from the direction in which the air-fuel mixture enters the bifurcate port 14 from the induction manifold runner at an angle which causes the liquid fuel flowing therethrough (in the form of a film on the passage walls) to have a velocity which carries it along a flight path (such as shown by the flow arrow) which is non-intersective with the electrodes of the spark plug.

Figure 4:
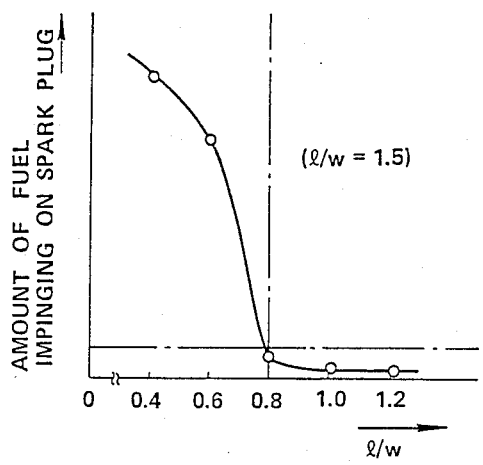
FIGS. 4 and 5 are graphs showing in terms of (a) the amount of fuel which impinges on the spark plug and (b) selected ratios of the dimensions, the effect of the varying said dimensions on plug wetting.
Figure 5:
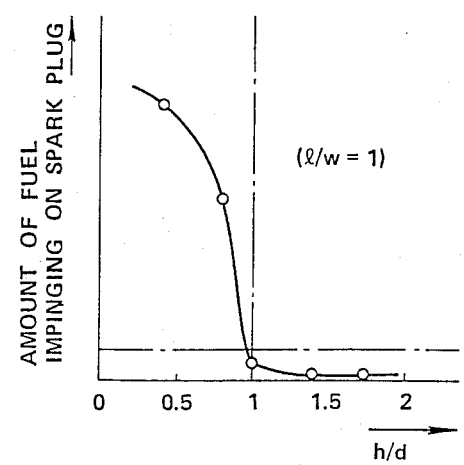

In order to achieve the above phenomenon, it has been discovered that if branch 22 is arranged with respect to the position of the spark plug 30 so that: the spark plug 30 lies within a sector defined between a theoretical line A which lies on the lower face of the cylinder head 10 and which is essentially normal to the plane on which the mouth of port 14 lies, and a line B which intersects line B at the level where the bifurcation of the induction port begins and which extends along essentially parallel to the inboard edge of branch 22 as seen in plan; the width of branch 22 is "W" and length thereof taken along line A is "1"; the displacement of center of the spark plug 30 from line B is "h" and the width of the plug itself is "d"; and if the above mentioned dimensions are selected so that the ratio of h/d is greater than or equal to 1.0 and the ratio of 1/W is equal to or greater than 0.8 then, without loss of engine performance the liquid fuel will enter the combustion chamber with a horizontal velocity component (viz., a component which is parallel to a plane normal to the cylinder bore axis) which induces same to follow a trajectory or flight path which by-passes the zone of spark plug. Viz., as shown in the graphs of FIGS. 4 and 5, if the h/d ratio is held constant at a value of 1.5 and the ratio of 1/W is varied, at a 1/W value 0.8 the wetting of the spark plug 30 decreases toward an essentially constant value; while if the ratio of 1/W is held constant at a value of 1.0 and the ration of h/d is varied, then at a h/d value of 1.0 the wetting phenomenon drops off to an essentially constant value.

FIGS. 6 to 8 show a second embodiment of the present invention. In this arrangement the arrangement of the intake port is essentially the same as that of the first embodiment and differs in that the passages 20 and 22 are arranged to have cross sections of the nature shown in FIGS. 7 and 8. It has been found that by flattening the walls of the branch sections 20 and 22 as shown, the flow of liquid fuel film along the walls of the branches tends to vary in manner which further improves the directing of the fuel away from the spark plug location.

Figure 10:
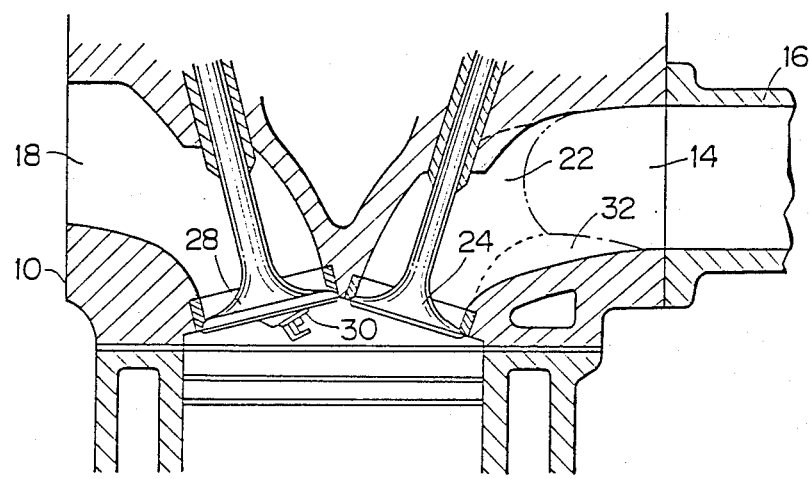

FIGS. 9 and 10 show a third embodiment of the present invention. In this arrangement branch 22 is arranged to have the lower floor section 32 thereof slightly elevated to endow a downwardly curved configuration on the passage and thus induce the charge flowing therethrough to essentially follow the direction of the stem of valve 26. With this arrangement the liquid fuel tend to carried to a level in the combustion chamber which is lower than that of the spark plug electrodes and thus obivates the wetting thereof. The elevated floor section 32 tends to prevent the film of liquid fuel on the floor of port arrangement from passing through branch 22 and thus induce an increased amount of liquid fuel carrying air-fuel mixture to pass through branch 20 upon opening of valve 24. However, this arrangement while being effective in reducing the wetting tends to the reduce both the flow velocity and the swirl inducing horizontal flow component of the charge delivered into the combustion chamber through port 22. However, the improved performance derived by preventing the wetting of the spark plug offsets the reduced swirl generation.

Figure 11:
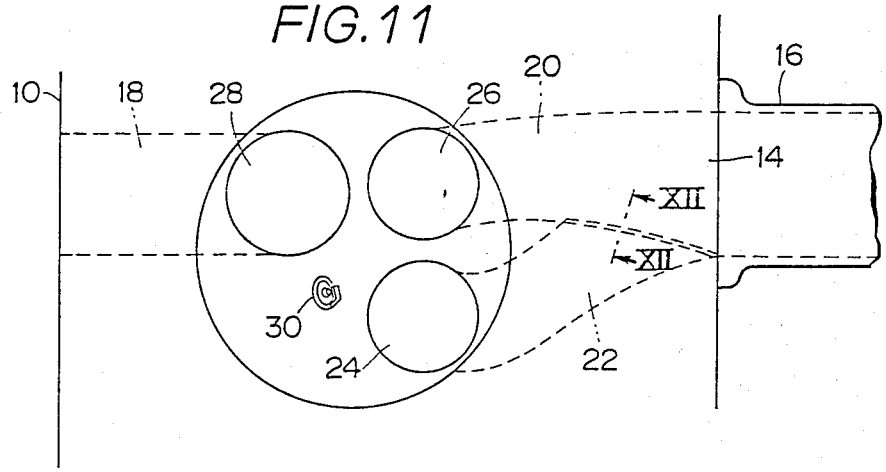
FIG. 11 shows a fourth embodiment of the present invention.
Figure 12:
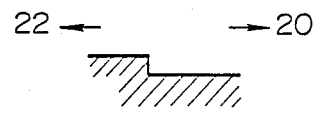
FIGS. 12 and 13 show possible port configurations which can be seen along section line XII—XII of FIG. 11.
Figure 13:

FIGS. 11 to 13 show a fourth embodiment of the present invention. In this arrangement branch passage 22 is arranged to open into the wall of branch 20 as shown. This arrangement allows the liquid fuel entering the mouth of the intake port to be carried past the mouth or entrance of branch 22 and penetrate toward valve 24. The amount of liquid fuel which actually enters branch 22 is thus reduced and permits the configuration of branch 22 to be rendered such as promote good swirl generation. In order to improve the carburetion of the liquid fuel which actually entering branch 22, all or part of the perimeter of the mouth thereof may be provided with a step-like section such as shown in FIG. 12 or alternatively a gutter such as shown in FIG. 13. These arrangements tend to prevent the entry of the film of fuel flowing along the walls of the port arrangement and further generate turbulence which agitates and mixes the fuel film which does enter into branch 22 with the air prior entry into the combustion chamber and thus further promotes the non-wetting effect of the instant embodiment.

What is claimed is:
1. An internal combustion engine, comprising:
a combustion chamber including a spark plug, first and second inlet valves and an exhaust valve therein;
a bifurcate intake port for intaking an air-fuel mixture containing a vaporous air-fuel charge and a relatively heavier liquid fuel charge, said intake port having a main section and first and second branch passages which lead from said main section to said combustion chamber;
said first branch passage defining a first flow path being disposed at an angle with respect to said main section and said combustion chamber;
said second branch passage defining a second flow path substantially aligned between said combustion chamber and said main section; and
said spark plug being disposed between said first and second flow paths;
whereby the heavier liquid fuel charge substantially flows along the second flow path under the influence of its own inertia and is substantially non-intersective with said spark plug, and the air-fuel charge substantially flows along the first flow path wherein it swirls in said combustion chamber.
2. An internal combustion engine, comprising:
a combustion chamber including a spark plug, first and second inlet valves and an exhaust valve therein;
a bifurcate intake port for intaking an air-fuel mixture containing a vaporous air-fuel charge and a relatively heavier liquid fuel charge, said intake port having a main section and first and second branch passages which lead from said main section to said combustion chamber;

said first branch passage defining a first flow path being disposed at an angle with respect to said main section and said combustion chamber;

said second branch passage defining a second flow path substantially aligned between said combustion chamber;

at least one of said first or second branch passages having a substantially flat wall section; and said spark plug being disposed between said first and second flow paths;

whereby the air-fuel mixture flows along said first and said second flow paths wherein said heavier liquid fuel charge, under the influence of its own inertia, flows along a path which is non-intersective with said spark plug and said air-fuel charge swirls in said combustion chamber.

3. In an internal combustion engine having a combustion chamber, first and second inlet valves, an exhaust valve and a spark plug a bifurcate intake port having a main section with an entrance adapted to communicate with an induction system and first and second branch passages which lead from said main section to said first and second inlet valves, respectively, said first branch passage being formed with an essentially flat wall section, said flat wall section influencing the flow of the liquid fuel in the air-fuel charge which passes through said first branch passage in a manner which directs the flow which enters the combustion chamber in a manner that the liquid fuel in the air-fuel charge is guided away from a path which is intersective with said spark plug.

4. An internal combustion engine as claimed in claim 3, wherein said second passage is also formed with a flat wall section, the flat wall section of said second branch passage being arranged to guide the flow which passes therethrough in such a manner that upon entry into said combustion chamber the flow from said second branch passage cooperates with the flow from said first branch passage to decrease the incidence of liquid fuel encountering said spark plug.

5. A method of operating an internal combustion engine comprising the steps of:

forming an air-fuel mixture;

directing the air-fuel mixture to a combustion chamber though a bifurcate intake port;

configuring the passages of said bifurcate intake port to cause liquid fuel contained in the air-fuel charge to have a velocity which carries the liquid fuel along a flight path which is non-intersective with a spark plug which projects into said combustion chamber, wherein said step of configuring includes:

arranging a first branch passage of the bifurcate port which introduces the air-fuel charge into the combustion chamber in such a manner to cause the air-fuel charge to swirl therein and to intersect with and flow over the spark plug, said first branch passage having a length, a width and an orientation which cause a portion of the liquid fuel which flows therethrough to follow a path in said combustion chamber which is non-intersective with said spark plug, said portion being sufficient to substantially obviate wetting of the spark plug at low engine temperatures and at engine idling.

6. A method as claimed in claim 5, wherein said step of configuring includes:

said first branch passage having an entrance with opens into the side of the other branch passage of the port arrangement and which further comprises the step of permitting the liquid fuel to be predominantly carried past said entrance and into the other branch passage under the influence of its own inertia.

7. A method of operating an internal combustion engine comprising the steps of:

forming an air-fuel mixture;

directing said air-fuel mixture into a combustion chamber through a bifurcate intake port having a main section adapted to communicate with an induction system and having first and second branch passages which lead from said main section to first and second inlet valves, respectively, introducing an air-fuel mixture which includes liquid fuel through one of said intake ports into said combustion chamber in a manner to impart a swirl thereto and to cause said swirling mixture to intersect with and sweep over said spark plug; and imparting a velocity to the liquid fuel contained in said air-fuel mixture, said velocity being sufficient to carry an amount of said liquid fuel along a path which is non-intersective with said spark plug which is sufficient to substantially obviate wetting of said spark plug.

8. An internal combustion engine comprising:

a cylinder head including a combustion chamber;

a spark plug disposed in said cylinder head;

a first inlet valve disposed in said cylinder head;

a second inlet valve disposed in said cylinder head;

an exhaust valve disposed in said cylinder head;

a bifurcate intake port formed in said cylinder head, said bifurcate intake port comprising:

a main section which has an inlet mouth adapted to communicate with an induction system, and first and second branch passages which lead from said main section to said first and second inlet valves, respectively, said first branch passage having a structure which is arranged to introduce an air-fuel mixture containing liquid fuel into said cylinder so that the mixture swirls and also intersects with and flows over said spark plug, said first branch passage further including means for minimizing wetting of said spark plug with said liquid fuel during low load operation of the engine said means comprising:

(a) said spark plug having a section which projects into said combustion chamber at a location which, lies within a sector defined between a first theoretical line which lies on a lower face of said cylinder head and which is essentially normal to the plane of said inlet mouth and a second theoretical line which intersects said first line at a level where the bifurcation of said first and second branch passages begins, said second line extending along essentially the inboard edge of said first branch passage as, (b) said first passage having a width "W" and a length "l" taken along said second line, (c) said spark plug having a section which extends into said combustion chamber and which has a width "d" and a center which is displaced from said first line by "h", in that:

(d) the ratio of h/d is greater than or equal to 1.0; and in that:

(e) the ratio of l/W is greater than or equal to 0.8.

9. An internal combustion engine, comprising:

a combustion chamber including:

a spark plug, first and second inlet valves and an exhaust valve therein;

a bifurcate intake port for intaking an air-fuel mixture, containing a vaporous air-fuel charge and a relatively heavier liquid fuel charge, said intake port having a main section and first and second branch passages which lead from said main section to said combustion chamber;

said first branch passage having a substantially flat wall section and defining a first flow path being disposed at an angle with respect to said main section and said combustion chamber;

said second branch passage defining a second flow path substantially aligned between said combustion chamber and said main section; and said spark plug being disposed between said first and second flow paths;

whereby the heavier liquid fuel charge substantially flows along the second flow path under the influence of its own inertia and the air-fuel charge substantially flows along the first flow path wherein it swirls in said combustion chamber.

10. The internal combustion engine of claim 9, wherein said second branch passage has a substantially flat wall section.

11. An internal combustion engine comprising:

a combustion chamber;

a spark plug;

a first inlet valve;

a second inlet valve;

an exhaust valve;

a bifurcate intake port having a main section adapted to communicate with an induction system and first and second branch passages which lead from said main section to said first and second inlet valves, respectively, said first branch passage comprising:

(a) means for introducing an air-fuel mixture, which flows therethrough and which contains liquid fuel, into said combustion chamber in a manner to impart a swirl thereto and to cause said swirling mixture to intersect with and flow over said spark plug; and (b) means for imparting a velocity to the liquid fuel of said air-fuel mixture sufficient to carry an amount of said liquid fuel along a path which is non-intersective with said spark plug which is sufficient to substantially obviate wetting of said spark plug.

12. An internal combustion engine as claimed in claim 11, wherein said first passage is formed with a floor section which induces the flow of the air-fuel mixture passing therethrough to flow essentially in the direction of a stem of said first inlet valve and enter the combustion chamber in such a manner that the liquid fuel has a vertical flow component which carries it sufficiently deep into the combustion chamber so as to avoid contact with said spark plug.

13. An internal combustion engine as claimed in claim 10, wherein the entrance of said main section and an entrance of said second passage section are coincidental and an entrance of said first branch passage opens into a side wall of the second branch passage, the arrangement being such that the liquid fuel is predominantly carried past the entrance of said first branch passage and flows into said second passage under the influence of its own inertia, said first passage being constructed and arranged to introduce the air-fuel charge which flows therethrough into said combustion chamber in said manner wherein it swirls in said combustion chamber.

* * * * *